US010023161B2

(12) United States Patent
Johnson et al.

(10) Patent No.: US 10,023,161 B2
(45) Date of Patent: *Jul. 17, 2018

(54) BRAKING CONTROL SYSTEM FOR VEHICLE

(71) Applicant: MAGNA ELECTRONICS INC., Auburn Hills, MI (US)

(72) Inventors: Nathaniel S. Johnson, Royal Oak, MI (US); William J. Chundrlik, Jr., Rochester Hills, MI (US); Paul A. VanOphem, Washington, MI (US); Christopher L. Van Dan Elzen, Rochester, MI (US)

(73) Assignee: MAGNA ELECTRONICS INC., Auburn Hills, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 15/338,778

(22) Filed: Oct. 31, 2016

(65) Prior Publication Data

US 2017/0043753 A1    Feb. 16, 2017

Related U.S. Application Data

(63) Continuation of application No. 14/809,542, filed on Jul. 27, 2015, now Pat. No. 9,481,344, which is a
(Continued)

(51) Int. Cl.
G06G 7/76 (2006.01)
B60T 7/22 (2006.01)
B60W 30/08 (2012.01)

(52) U.S. Cl.
CPC ........... *B60T 7/22* (2013.01); *B60T 2201/022* (2013.01); *B60T 2210/32* (2013.01); *B60W 2030/082* (2013.01)

(58) Field of Classification Search
USPC .......................................................... 701/70
See application file for complete search history.

(56) References Cited

U.S. PATENT DOCUMENTS 4,720,790 A    1/1988  Miki et al.
4,987,357 A    1/1991  Masaki
(Continued)

FOREIGN PATENT DOCUMENTS

WO    WO2013/081984    6/2013

*Primary Examiner* — Tyler Paige
(74) *Attorney, Agent, or Firm* — Honigman Miller Schwartz and Cohn, LLP

(57) ABSTRACT

An automatic emergency braking system for a vehicle includes a forward viewing camera and a control. At least in part responsive to processing of captured image data, the presence of another vehicle closing on the subject vehicle is determined, and a relative speed of the subject vehicle relative to the other vehicle is also determined. Responsive at least in part to a speed of the subject vehicle and the determined relative speed, the control controls the subject vehicle's brake system. Responsive to determination that the driver of the subject vehicle is impaired, the automatic emergency braking system does not allow the driver to override the control's control of the subject vehicle's brake system. Responsive to a determination that the driver of the subject vehicle is not impaired, the automatic emergency braking system allows the driver to override the control's control of the subject vehicle' brake system.

21 Claims, 2 Drawing Sheets

Related U.S. Application Data continuation of application No. 14/082,575, filed on Nov. 18, 2013, now Pat. No. 9,090,234.

(60) Provisional application No. 61/727,910, filed on Nov. 19, 2012.

(56) References Cited

U.S. PATENT DOCUMENTS

| | | |
|---|---|---|
| 4,991,054 A | 2/1991 | Walters |
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,044,706 A | 9/1991 | Chen |
| 5,055,668 A | 10/1991 | French |
| 5,059,877 A | 10/1991 | Teder |
| 5,064,274 A | 11/1991 | Alten |
| 5,072,154 A | 12/1991 | Chen |
| 5,073,012 A | 12/1991 | Lynam |
| 5,076,673 A | 12/1991 | Lynam et al. |
| 5,086,253 A | 2/1992 | Lawler |
| 5,096,287 A | 3/1992 | Kakinami et al. |
| 5,097,362 A | 3/1992 | Lynas |
| 5,115,346 A | 5/1992 | Lynam |
| 5,121,200 A | 6/1992 | Choi |
| 5,124,549 A | 6/1992 | Michaels et al. |
| 5,130,709 A | 7/1992 | Toyama et al. |
| 5,148,014 A | 9/1992 | Lynam |
| 5,151,816 A | 9/1992 | Varaprasad et al. |
| 5,168,378 A | 12/1992 | Black |
| 5,170,374 A | 12/1992 | Shimohigashi et al. |
| 5,172,235 A | 12/1992 | Wilm et al. |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,193,029 A | 3/1993 | Schofield |
| 5,204,778 A | 4/1993 | Bechtel |
| 5,208,701 A | 5/1993 | Maeda |
| 5,245,422 A | 9/1993 | Borcherts et al. |
| 5,253,109 A | 10/1993 | O'Farrell |
| 5,255,442 A | 10/1993 | Schierbeek et al. |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,406,414 A | 4/1995 | O'Farrell et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,497,306 A | 3/1996 | Pastrick |
| 5,498,866 A | 3/1996 | Bendicks et al. |
| 5,500,766 A | 3/1996 | Stonecypher |
| 5,510,983 A | 4/1996 | Iino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,555 A | 9/1996 | Sato et al. |
| 5,568,027 A | 10/1996 | Teder |
| 5,574,443 A | 11/1996 | Hsieh |
| 5,581,464 A | 12/1996 | Woll et al. |
| 5,594,222 A | 1/1997 | Caldwell |
| 5,610,756 A | 3/1997 | Lynam et al. |
| 5,614,788 A | 3/1997 | Mullins |
| 5,619,370 A | 4/1997 | Guinosso |
| 5,632,092 A | 5/1997 | Blank et al. |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,670,935 A | 9/1997 | Schofield et al. |
| 5,677,851 A | 10/1997 | Kingdon et al. |
| 5,699,044 A | 12/1997 | Van Lente et al. |
| 5,724,316 A | 3/1998 | Brunts |
| 5,732,379 A | 3/1998 | Eckert et al. |
| 5,737,226 A | 4/1998 | Olson et al. |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,765,116 A | 6/1998 | Wilson-Jones et al. |
| 5,765,118 A | 6/1998 | Fukatani |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,835,255 A | 11/1998 | Miles |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,357 A | 3/1999 | Sivashankar et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,915,800 A | 6/1999 | Hiwatashi et al. |

(56) References Cited

U.S. PATENT DOCUMENTS

| | | |
|---|---|---|
| 5,923,027 A | 7/1999 | Stam et al. |
| 5,924,212 A | 7/1999 | Domanski |
| 5,929,786 A | 7/1999 | Schofield et al. |
| 5,949,331 A | 9/1999 | Schofield et al. |
| 5,959,555 A | 9/1999 | Furuta |
| 5,963,247 A | 10/1999 | Banitt |
| 5,986,796 A | 11/1999 | Miles |
| 5,990,469 A | 11/1999 | Bechtel et al. |
| 5,990,649 A | 11/1999 | Nagao et al. |
| 6,020,704 A | 2/2000 | Buschur |
| 6,049,171 A | 4/2000 | Stam et al. |
| 6,066,933 A | 5/2000 | Ponziana |
| 6,084,519 A | 7/2000 | Coulling et al. |
| 6,097,023 A | 8/2000 | Schofield et al. |
| 6,097,024 A | 8/2000 | Stam et al. |
| 6,105,705 A | 8/2000 | Faye |
| 6,144,022 A | 11/2000 | Tenenbaum et al. |
| 6,175,300 B1 | 1/2001 | Kendrick |
| 6,178,034 B1 | 1/2001 | Allemand et al. |
| 6,198,409 B1 | 3/2001 | Schofield et al. |
| 6,201,642 B1 | 3/2001 | Bos et al. |
| 6,222,447 B1 | 4/2001 | Schofield et al. |
| 6,223,114 B1 | 4/2001 | Boros et al. |
| 6,227,689 B1 | 5/2001 | Miller |
| 6,250,148 B1 | 6/2001 | Lynam |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,294,989 B1 | 9/2001 | Schofield et al. |
| 6,297,781 B1 | 10/2001 | Turnbull et al. |
| 6,302,545 B1 | 10/2001 | Schofield et al. |
| 6,310,611 B1 | 10/2001 | Caldwell |
| 6,313,454 B1 | 11/2001 | Bos et al. |
| 6,317,057 B1 | 11/2001 | Lee |
| 6,320,176 B1 | 11/2001 | Schofield et al. |
| 6,320,282 B1 | 11/2001 | Caldwell |
| 6,333,759 B1 | 12/2001 | Mazzilli |
| 6,341,523 B2 | 1/2002 | Lynam |
| 6,353,392 B1 | 3/2002 | Schofield et al. |
| 6,370,329 B1 | 4/2002 | Teuchert |
| 6,392,315 B1 | 5/2002 | Jones et al. |
| 6,396,397 B1 | 5/2002 | Bos et al. |
| 6,420,975 B1 | 7/2002 | DeLine et al. |
| 6,424,273 B1 | 7/2002 | Gutta et al. |
| 6,430,303 B1 | 8/2002 | Naoi et al. |
| 6,442,465 B2 | 8/2002 | Breed et al. |
| 6,477,464 B2 | 11/2002 | McCarthy et al. |
| 6,497,503 B1 | 12/2002 | Dassanayake et al. |
| 6,498,620 B2 | 12/2002 | Schofield et al. |
| 6,516,664 B2 | 2/2003 | Lynam |
| 6,523,964 B2 | 2/2003 | Schofield et al. |
| 6,534,884 B2 | 3/2003 | Marcus et al. |
| 6,539,306 B2 | 3/2003 | Turnbull |
| 6,547,133 B1 | 4/2003 | DeVries, Jr. et al. |
| 6,553,130 B1 | 4/2003 | Lemelson et al. |
| 6,559,435 B2 | 5/2003 | Schofield et al. |
| 6,574,033 B1 | 6/2003 | Chui et al. |
| 6,589,625 B1 | 7/2003 | Kothari et al. |
| 6,594,583 B2 | 7/2003 | Ogura et al. |
| 6,611,202 B2 | 8/2003 | Schofield et al. |
| 6,611,610 B1 | 8/2003 | Stam et al. |
| 6,636,258 B2 | 10/2003 | Strumolo |
| 6,650,455 B2 | 11/2003 | Miles |
| 6,672,731 B2 | 1/2004 | Schnell et al. |
| 6,674,562 B1 | 1/2004 | Miles |
| 6,678,614 B2 | 1/2004 | McCarthy et al. |
| 6,680,792 B2 | 1/2004 | Miles |
| 6,690,268 B2 | 2/2004 | Schofield et al. |
| 6,700,605 B1 | 3/2004 | Toyoda et al. |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,717,610 B1 | 4/2004 | Bos et al. |
| 6,735,506 B2 | 5/2004 | Breed et al. |
| 6,741,377 B2 | 5/2004 | Miles |
| 6,744,353 B2 | 6/2004 | Sjönell |
| 6,757,109 B2 | 6/2004 | Bos |
| 6,762,867 B2 | 7/2004 | Lippert et al. |
| 6,794,119 B2 | 9/2004 | Miles |
| 6,795,221 B1 | 9/2004 | Urey |
| 6,802,617 B2 | 10/2004 | Schofield et al. |
| 6,806,452 B2 | 10/2004 | Bos et al. |
| 6,819,231 B2 | 11/2004 | Berberich et al. |
| 6,822,563 B2 | 11/2004 | Bos et al. |
| 6,823,241 B2 | 11/2004 | Shirato et al. |
| 6,824,281 B2 | 11/2004 | Schofield et al. |
| 6,831,261 B2 | 12/2004 | Schofield et al. |
| 6,850,156 B2 | 2/2005 | Bloomfield et al. |
| 6,882,287 B2 | 4/2005 | Schofield |
| 6,889,161 B2 | 5/2005 | Winner et al. |
| 6,891,563 B2 | 5/2005 | Schofield et al. |
| 6,909,753 B2 | 6/2005 | Meehan et al. |
| 6,922,622 B2 * | 7/2005 | Dulin .................... B06B 1/0215 180/272 |
| 6,946,978 B2 | 9/2005 | Schofield |
| 6,953,253 B2 | 10/2005 | Schofield et al. |
| 6,968,736 B2 | 11/2005 | Lynam |
| 6,975,775 B2 | 12/2005 | Rykowski et al. |
| 6,989,736 B2 | 1/2006 | Berberich et al. |
| 7,004,606 B2 | 2/2006 | Schofield |
| 7,005,974 B2 | 2/2006 | McMahon et al. |
| 7,038,577 B2 | 5/2006 | Pawlicki et al. |
| 7,062,300 B1 | 6/2006 | Kim |
| 7,065,432 B2 | 6/2006 | Moisel et al. |
| 7,079,017 B2 | 7/2006 | Lang et al. |
| 7,085,637 B2 | 8/2006 | Breed et al. |
| 7,092,548 B2 | 8/2006 | Laumeyer et al. |
| 7,111,968 B2 | 9/2006 | Bauer et al. |
| 7,116,246 B2 | 10/2006 | Winter et al. |
| 7,123,168 B2 | 10/2006 | Schofield |
| 7,145,519 B2 | 12/2006 | Takahashi et al. |
| 7,149,613 B2 | 12/2006 | Stam et al. |
| 7,161,616 B1 | 1/2007 | Okamoto et al. |
| 7,167,796 B2 | 1/2007 | Taylor et al. |
| 7,195,381 B2 | 3/2007 | Lynam et al. |
| 7,202,776 B2 | 4/2007 | Breed |
| 7,205,904 B2 | 4/2007 | Schofield |
| 7,227,459 B2 | 6/2007 | Bos et al. |
| 7,227,611 B2 | 6/2007 | Hull et al. |
| 7,311,406 B2 | 12/2007 | Schofield et al. |
| 7,325,934 B2 | 2/2008 | Schofield et al. |
| 7,325,935 B2 | 2/2008 | Schofield et al. |
| 7,338,177 B2 | 3/2008 | Lynam |
| 7,339,149 B1 | 3/2008 | Schofield et al. |
| 7,344,261 B2 | 3/2008 | Schofield et al. |
| 7,355,524 B2 | 4/2008 | Schofield |
| 7,370,983 B2 | 5/2008 | De Wind et al. |
| 7,380,948 B2 | 6/2008 | Schofield et al. |
| 7,388,182 B2 | 6/2008 | Schofield et al. |
| 7,402,786 B2 | 7/2008 | Schofield et al. |
| 7,423,248 B2 | 9/2008 | Schofield et al. |
| 7,425,076 B2 | 9/2008 | Schofield et al. |
| 7,446,650 B2 | 11/2008 | Schofield et al. |
| 7,459,664 B2 | 12/2008 | Schofield et al. |
| 7,460,951 B2 | 12/2008 | Altan |
| 7,480,149 B2 | 1/2009 | DeWard et al. |
| 7,490,007 B2 | 2/2009 | Taylor et al. |
| 7,492,281 B2 | 2/2009 | Lynam et al. |
| 7,526,103 B2 | 4/2009 | Schofield et al. |
| 7,561,181 B2 | 7/2009 | Schofield et al. |
| 7,581,859 B2 | 9/2009 | Lynam |
| 7,592,928 B2 | 9/2009 | Chinomi et al. |
| 7,616,781 B2 | 11/2009 | Schofield et al. |
| 7,619,508 B2 | 11/2009 | Lynam et al. |
| 7,639,149 B2 | 12/2009 | Katoh |
| 7,681,960 B2 | 3/2010 | Wanke et al. |
| 7,720,580 B2 | 5/2010 | Higgins-Luthman |
| 7,777,611 B2 | 8/2010 | Desai |
| 7,855,755 B2 | 12/2010 | Weller et al. |
| 7,859,565 B2 | 12/2010 | Schofield et al. |
| 7,881,496 B2 | 2/2011 | Camilleri et al. |
| 7,914,187 B2 | 3/2011 | Higgins-Luthman et al. |
| 7,965,336 B2 | 6/2011 | Bingle et al. |

(56) References Cited

U.S. PATENT DOCUMENTS

| | | |
|---|---|---|
| 7,983,811 B2 | 7/2011 | Basir et al. |
| 8,013,780 B2 | 9/2011 | Lynam et al. |
| 8,027,029 B2 | 9/2011 | Lu et al. |
| 8,058,977 B2 | 11/2011 | Lynam |
| 8,340,866 B2 | 12/2012 | Hanzawa et al. |
| 8,694,224 B2 | 4/2014 | Chundrlik, Jr. et al. |
| 8,849,495 B2 | 9/2014 | Chundrlik, Jr. et al. |
| 9,090,234 B2 | 7/2015 | Johnson et al. |
| 9,481,344 B2 | 11/2016 | Johnson et al. |
| 2002/0015153 A1 | 2/2002 | Downs |
| 2002/0044065 A1 | 4/2002 | Quist et al. |
| 2002/0113873 A1 | 8/2002 | Williams |
| 2002/0120371 A1* | 8/2002 | Leivian ............... B60R 16/0231 701/1 |
| 2002/0159270 A1 | 10/2002 | Lynam et al. |
| 2003/0090150 A1 | 5/2003 | Woo |
| 2003/0132666 A1 | 7/2003 | Bond et al. |
| 2003/0137586 A1 | 7/2003 | Lewellen |
| 2003/0222982 A1 | 12/2003 | Hamdan et al. |
| 2003/0227777 A1 | 12/2003 | Schofield |
| 2004/0012488 A1 | 1/2004 | Schofield |
| 2004/0016870 A1 | 1/2004 | Pawlicki et al. |
| 2004/0032321 A1 | 2/2004 | McMahon et al. |
| 2004/0051634 A1 | 3/2004 | Schofield et al. |
| 2004/0114381 A1 | 6/2004 | Salmeen et al. |
| 2004/0128065 A1 | 7/2004 | Taylor et al. |
| 2004/0200948 A1 | 10/2004 | Bos et al. |
| 2005/0078389 A1 | 4/2005 | Kulas et al. |
| 2005/0134966 A1 | 6/2005 | Burgner |
| 2005/0134983 A1 | 6/2005 | Lynam |
| 2005/0146792 A1 | 7/2005 | Schofield et al. |
| 2005/0162262 A1 | 7/2005 | Dowdy |
| 2005/0169003 A1 | 8/2005 | Lindahl et al. |
| 2005/0195488 A1 | 9/2005 | McCabe et al. |
| 2005/0200700 A1 | 9/2005 | Schofield et al. |
| 2005/0232469 A1 | 10/2005 | Schofield et al. |
| 2005/0264891 A1 | 12/2005 | Uken et al. |
| 2006/0018511 A1 | 1/2006 | Stam et al. |
| 2006/0018512 A1 | 1/2006 | Stam et al. |
| 2006/0028731 A1 | 2/2006 | Schofield et al. |
| 2006/0050018 A1 | 3/2006 | Hutzel et al. |
| 2006/0061008 A1 | 3/2006 | Karner et al. |
| 2006/0091813 A1 | 5/2006 | Stam et al. |
| 2006/0103727 A1 | 5/2006 | Tseng |
| 2006/0164230 A1 | 7/2006 | DeWind et al. |
| 2006/0250501 A1 | 11/2006 | Wildmann et al. |
| 2006/0290479 A1 | 12/2006 | Akatsuka et al. |
| 2007/0008151 A1* | 1/2007 | Victor ..................... A61B 5/11 340/573.1 |
| 2007/0023613 A1 | 2/2007 | Schofield et al. |
| 2007/0032929 A1 | 2/2007 | Yoshioka et al. |
| 2007/0052530 A1 | 3/2007 | Diebold |
| 2007/0104476 A1 | 5/2007 | Yasutomi et al. |
| 2007/0109406 A1 | 5/2007 | Schofield et al. |
| 2007/0109651 A1 | 5/2007 | Schofield et al. |
| 2007/0109652 A1 | 5/2007 | Schofield et al. |
| 2007/0109653 A1 | 5/2007 | Schofield et al. |
| 2007/0109654 A1 | 5/2007 | Schofield et al. |
| 2007/0120657 A1 | 5/2007 | Schofield et al. |
| 2007/0129891 A1* | 6/2007 | Yano ..................... B60T 7/22 701/301 |
| 2007/0176080 A1 | 8/2007 | Schofield et al. |
| 2008/0161986 A1 | 7/2008 | Breed |
| 2008/0180529 A1 | 7/2008 | Taylor et al. |
| 2008/0252466 A1* | 10/2008 | Yopp ..................... B60K 28/066 340/576 |
| 2009/0034796 A1 | 2/2009 | Johns |
| 2009/0071791 A1 | 3/2009 | Wang |
| 2009/0113509 A1 | 4/2009 | Tseng et al. |
| 2009/0143986 A1* | 6/2009 | Stein ..................... G08G 1/16 701/301 |
| 2009/0177347 A1* | 7/2009 | Breuer ................... B60T 7/22 701/31.4 |
| 2009/0243824 A1 | 10/2009 | Peterson et al. |
| 2009/0244361 A1 | 10/2009 | Gebauer et al. |
| 2009/0295181 A1 | 12/2009 | Lawlor et al. |
| 2010/0020170 A1 | 1/2010 | Higgins-Luthman et al. |
| 2010/0045797 A1 | 2/2010 | Schofield et al. |
| 2010/0097469 A1 | 4/2010 | Blank et al. |
| 2010/0131304 A1 | 5/2010 | Collopy |
| 2010/0228437 A1 | 9/2010 | Hanzawa et al. |
| 2010/0318256 A1* | 12/2010 | Breuer ................... B60T 7/22 701/31.4 |
| 2011/0125372 A1 | 5/2011 | Ito |
| 2011/0224875 A1 | 9/2011 | Cuddihy et al. |
| 2011/0264347 A1 | 10/2011 | Cetinkaya |
| 2011/0264348 A1 | 10/2011 | Cetinkaya |
| 2012/0004819 A1 | 1/2012 | Lu |
| 2012/0062743 A1 | 3/2012 | Lynam et al. |
| 2012/0161980 A1 | 6/2012 | Bonne |
| 2012/0209505 A1 | 8/2012 | Breed et al. |
| 2012/0218412 A1 | 8/2012 | Dellantoni et al. |
| 2012/0239253 A1* | 9/2012 | Schmidt .................. B60T 7/22 701/41 |
| 2012/0245817 A1 | 9/2012 | Cooprider et al. |
| 2012/0262340 A1 | 10/2012 | Hassan et al. |
| 2012/0303222 A1 | 11/2012 | Cooprider et al. |
| 2013/0124052 A1 | 5/2013 | Hahne |
| 2013/0131918 A1 | 5/2013 | Hahne |
| 2013/0226408 A1* | 8/2013 | Fung ..................... B60W 40/09 701/41 |
| 2013/0231825 A1 | 9/2013 | Chundrlik, Jr. |
| 2014/0067206 A1 | 3/2014 | Pflug |

\* cited by examiner

BRAKING CONTROL SYSTEM FOR VEHICLE

CROSS REFERENCE TO RELATED APPLICATIONS

The present application is a continuation of U.S. patent application Ser. No. 14/809,542, filed Jul. 27, 2015, now U.S. Pat. No. 9,481,344, which is a continuation of U.S. patent application Ser. No. 14/082,575, filed Nov. 18, 2013, now U.S. Pat. No. 9,090,234, which claims the filing benefits of U.S. provisional application Ser. No. 61/727,910, filed Nov. 19, 2012, which is hereby incorporated herein by reference in its entirety.

FIELD OF THE INVENTION

The present invention relates to automatic emergency braking systems for vehicles.

BACKGROUND OF THE INVENTION

Automatic emergency braking systems are known. Examples of such known systems are described in U.S. Publication No. US2012-0218412 and/or U.S. Pat. Nos. 6,850,156; 7,123,168; 6,534,884; 5,949,331; 5,670,935 and/or 5,550,677, which are hereby incorporated herein by reference in their entireties.

SUMMARY OF THE INVENTION

The present invention provides a braking control system for resolving automatic braking events that, responsive to a determination that a collision is likely or imminent and actuation of the brake system of a vehicle by the automatic emergency braking system of the vehicle, controls the brake system of the vehicle. After the initial determination of a likely or imminent collision, and after the brake system has initially been applied by the automatic braking system, the braking control system of the present invention (which may be a separate system or part of the automatic braking system) further determines or monitors the vehicle speed and approach rate to the other vehicle or object, and continues to control the brakes or apply the brakes or release the brakes based on various relationships between the speed of the subject vehicle and the relative speed or location of the target vehicle or object and the status of the driver of the subject vehicle. The braking control system may allow for the driver to override the system only when the braking control system determines that the driver's driving abilities are not impaired or compromised or that the driver is not inattentive or unresponsive (such as due to a collision or near collision or airbag deployment or the like).

These and other objects, advantages, purposes and features of the present invention will become apparent upon review of the following specification in conjunction with the drawings.

DETAILED DESCRIPTION OF THE INVENTION

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a forward or rearward direction. The vision system includes an image processor or image processing system that is operable to receive image data from one or more cameras and provide an output to a display device for displaying images representative of the captured image data. The vision system may capture image data that may be processed by an image processor for use in association with various vehicle systems or driver assistance systems or display systems or the like.

Figure 1:
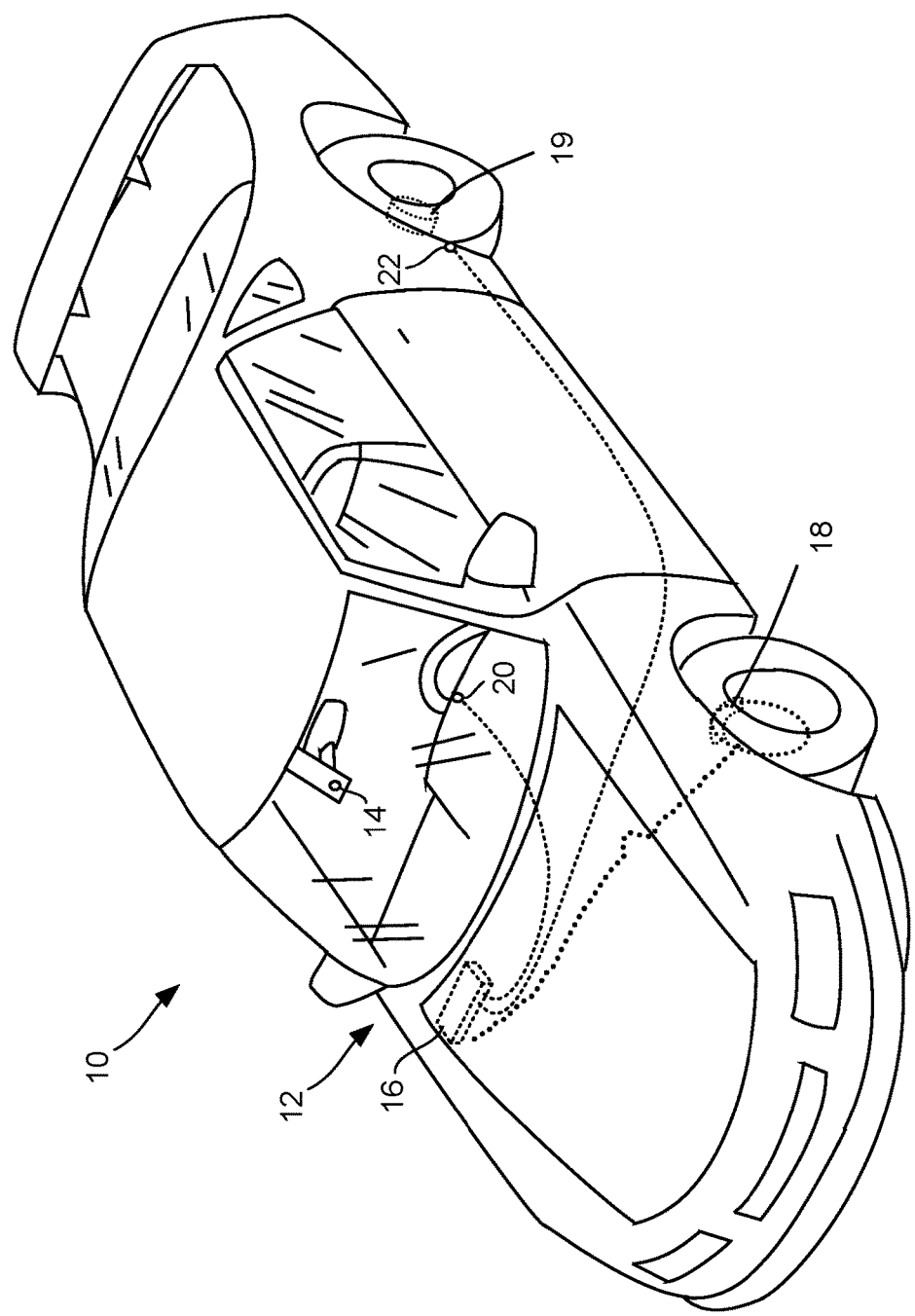
FIG. 1 is a perspective view of a vehicle with a braking system in accordance with the present invention.

Referring now to the drawings and the illustrative embodiments depicted therein, a vehicle 10 is equipped with an automatic emergency braking (AEB) system and/or dynamic brake support (DBS) system or braking control system 12 (or collision avoidance system or collision mitigation system or system for resolving automatic braking events) that includes at least one exterior facing imaging sensor or camera, such as a forwardly facing camera 14 (and optionally the system may include multiple exterior facing imaging sensors or cameras, such as a rearwardly facing camera at the rear of the vehicle, and a sidewardly/rearwardly facing camera at respective sides of the vehicle), which captures images exterior of the vehicle, with the camera having a lens for focusing images at or onto an imaging array or imaging plane or imager of the camera (FIG. 1). The braking control system 12 includes a control or electronic control unit (ECU) or processor 16 that is operable to process image data captured by the camera or that is operable to process controls or other signals provided by the camera. The data transfer or signal communication from the camera to the ECU may comprise any suitable data or communication link, such as a vehicle network bus or the like of the equipped vehicle.

The control 16 (which may comprise a single control unit of the vehicle or camera or two or more controls or processors of the vehicle and/or camera) of the braking control system 12 of the vehicle 10 is operable to actuate or apply the vehicle brakes 18, 19 of the vehicle, as discussed in detail below. The braking control system of the present invention may include or may be responsive to a steering wheel sensor 20 and/or vehicle speed sensor 22. The forward facing camera 14 may be disposed at a forward portion of the vehicle or may be disposed at or behind the windshield of the vehicle, such as at the interior rearview mirror assembly of the vehicle (such as shown in FIG. 1).

The performance expectations of autonomous emergency braking or AEB systems (where the vehicle system applies braking automatically when it determines that a collision is imminent) and/or dynamic brake support or DBS systems (where the system applies additional braking after the driver has pressed the brake pedal) have been under development for years. The focus of development has been on determining when the system should be triggered in order to prevent or mitigate a collision. However, once the system is activated, the system must also be deactivated at the appropriate time if the driver does not take control (referred to as a driver override) to prevent further collisions following the initial impact or immediate event or to reduce or limit or minimize the chance or severity of further collisions following the initial impact or immediate event. As proposed, EuroNCAP and NHTSA regulations only require mitigation, not prevention, of impact at high speed.

The AEB/DBS logic of the braking control system of the present invention can determine that a collision has occurred based on one or more inputs, such as (i) an input from one or more ranging sensors (which may include image based sensors, such as one or more cameras disposed at the vehicle and having an exterior field of view, and/or non-image-based sensors, such as a radar sensor, a laser sensor and/or an ultrasonic sensor and/or the like disposed at the vehicle), (ii) an input indicative of a triggering of a pre-crash sensor, (iii) an input indicative of an airbag deployment, (iv) an input indicative of a longitudinal acceleration (such as sudden deceleration and a spike in jerk or the like), (v) an input indicative of a drop in vehicle speed (such as a decrease in vehicle speed of more than a threshold amount), (vi) an input indicative of a threshold time-to-collision or TTC (time to collision between the subject vehicle and other vehicle, such as may be measured or determined or estimated by a ranging sensor, such as by image processing of image data captured by a camera or the like), and/or (vii) an input indicative of a threshold closing rate or relative velocity between the detected or approaching vehicle and the subject or equipped vehicle (note that, in this disclosure, the relative velocity between the target vehicle and subject vehicle is considered positive when the vehicles are closing or approaching one another and is considered negative when the vehicles are moving away from one another or when a gap between the vehicles is increasing).

In all cases, the potential latencies and errors of the sensors may be taken into account. One of the benefits of determining that a collision has occurred is that it allows the AEB/DBS logic to better handle input sensors that become noisy, damaged or destroyed due to the collision.

A moving vehicle is less likely to get in a rear end collision and less likely to result in injury, as evidenced 1990 NHTSA data. However, a moving vehicle is more likely to cause a severe injury as it could depart the lane and roll over, strike a wall, hit pedestrians and/or the like.

The ability of an AEB/DBS system to slow the subject vehicle is dependent on the physical capabilities of the vehicle brake system.

This influences the timing calibrations. A fully autonomous emergency braking (AEB) system can release the vehicle brakes when the Principle Other Vehicle (POV) or target vehicle or detected vehicle or approaching vehicle or closing vehicle is no longer closing in on the subject vehicle or SV (such as when the relative velocity is less than a threshold level or X calibration). The determination of whether or not the vehicle is closing (such as by determining the relative velocity of the POV to the SV) may be indirectly or directly determined by the sensor. Thresholds for calibrations may be determined by calculations or reference tables.

Figure 2:
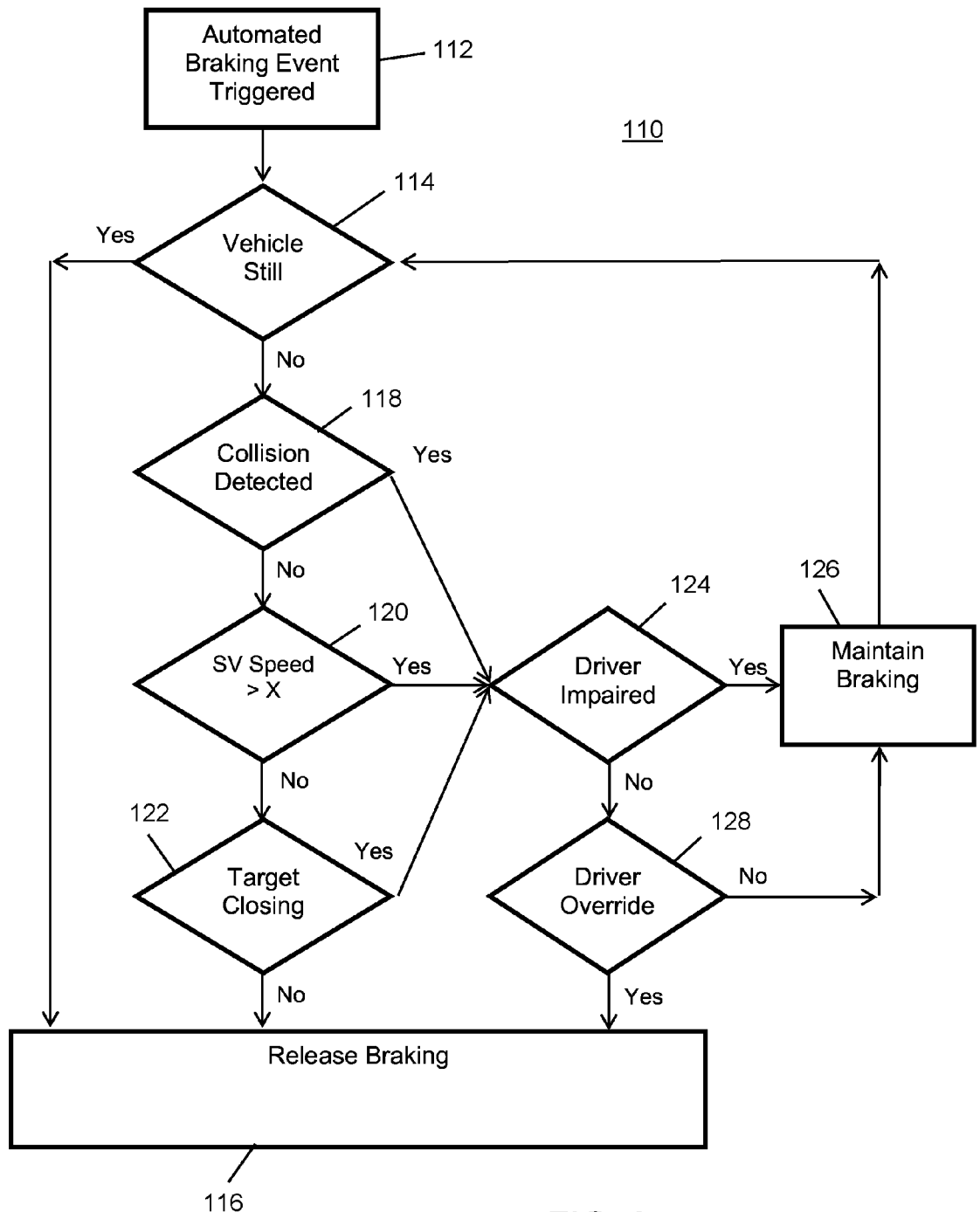
FIG. 2 is a logic flowchart of the braking control system in accordance with the present invention.

A flow chart of a braking control system (and its high-level logic) of the present invention is shown in FIG. 2. The braking control system is operable to control the braking of the subject vehicle after an autonomous emergency braking system or the like (which may be a separate system from the braking control system or may be part of an overall braking control system of the vehicle) is triggered and after the brakes are initially applied. The braking control system is then operable to determine movement of the subject vehicle and to determine whether or not a collision occurs and to determine the vehicle speed and to determine an approach rate or relative velocity between the subject vehicle and POV, and may apply and/or release the vehicle brakes responsive to such determinations. Optionally, the braking control system may have various driver overrides, where the control or system stops applying the vehicle brakes when it is determined that the driver has taken over control of the vehicle (such as when it is determined that the driver is applying the brakes and/or evasively maneuvering the vehicle to avoid the collision or the like). The braking control system is also responsive to a determination of driver impairment or the like, where the driver may not be fully aware of the situation or fully capable of responding to the situation and controlling the vehicle, and, responsive to such a determination, the system may or may not allow the driver to override the braking system.

Thus, the present invention provides an automatic emergency braking system or braking control system for a vehicle that controls or modulates the automatic braking and non-braking of the vehicle after the brakes are initially applied by an automatic emergency braking system (such as after the AEB/DBS system has triggered the automatic braking of the vehicle, such as responsive to a detection that a collision is likely or imminent). The braking control system, responsive at least in part to the vehicle speed and closing rate or rate of approach of the vehicle to a target vehicle, may modulate the vehicle brakes, such as by holding or applying the vehicle brakes until the vehicle is fully or substantially stopped or releasing the brakes after the initial application (such as where the subject vehicle speed is above a threshold speed but the approach rate is below a threshold rate).

For example, and with reference to FIG. 2, a system or process 110 of the braking control system of the present invention starts at 112, where the AEB/DBS automatic braking or event is triggered. If the subject vehicle (SV) speed is determined to be still or not moving at 114 (or moving at a reduced rate that is below a threshold speed) for a threshold period of time or calibratable amount of time, then the braking control system releases the vehicle brakes at 116. However, if the vehicle is determined at 114 to be moving, then the braking control system determines if a collision is detected at 118. If no collision is detected, then it is determined at 120 whether the SV speed is greater than a threshold speed level. If the SV speed is not greater than the threshold speed level, then it is determined at 122 if the target vehicle or POV is closing on the SV. If the target vehicle is not closing on the SV (in other words, the relative velocity is less than the threshold value or X calibration value), then the braking control system releases the vehicle brakes at 116 (and the system may release the brakes after a holding period).

If a collision is detected at 118, then the braking control system determines at 124 whether or not the driver is impaired (such as via determination of an airbag deployment or via a camera or monitoring system or eyesight tracking system that captures images of the driver's face and eyes to determine attentiveness and the like to determine if the driver is aware enough to override the system and properly control the vehicle), whereby an override function may only be allowed if the ability check is passed by the driver. Likewise, if no collision is detected at 118, but the SV speed is determined at 120 to be greater than a threshold speed level, then the braking control system determines if the driver is impaired at 124. Also, if no collision is detected at 118, and the SV speed is determined to be less than the threshold level at 120, but the target is determined at 122 to be closing (i.e., the relative velocity is greater than the threshold value or X calibration value), then the braking control system determines if the driver is impaired at 124.

The braking control system may determine if the driver of the subject vehicle is impaired or compromised or non-responsive via any suitable means. For example, a cabin monitoring system or driver head monitoring system (or any system that has a camera or image sensor that is operable to capture images of the driver's face or the like) may detect the driver's face and eyes to determine whether or not the driver is alert. Optionally, if a driver side or front airbag is deployed, the braking control system (which may receive a signal indicative of such airbag deployment) may determine that the driver is impaired or compromised. Optionally, if the driver behavior is highly erratic or unsafe (which the system may determine responsive to a brake pedal sensor and/or accelerator pedal sensor and/or steering wheel sensor or the like), the braking control system may determine that the driver is impaired or injured and not functioning or driving properly. Other means for determining that the driver is impaired or compromised and thus not fit to override the braking system may be implemented by the braking control system of the present invention.

If the braking control system determines that the driver is impaired or compromised or the like at 124, then the braking control system maintains braking of the vehicle at 126 until the vehicle is stopped, whereby the braking may be released. If the braking control system determines at 124 that the driver is not impaired, then the braking control system may allow the driver to override the vehicle braking system. Thus, if the driver is not impaired, then the braking control system determines at 128 whether or not there is a driver override (such as whether or not the unimpaired driver is manually applying the SV brakes or accelerator and/or evasively maneuvering the vehicle to avoid the collision or the like). If there is a driver override determined at 128, then the braking control system releases the brakes at 116, and if there is not a driver override determined at 128, then the braking control system maintains braking at 126 until the vehicle is stopped (such as determined at 114), whereby the vehicle braking may be released. Optionally, the braking control system may maintain application of the vehicle brakes even when it is determined that the driver is not impaired and is manually applying the vehicle brakes.

Thus, if a collision is not detected, the braking control system may continue to apply or release the vehicle braking based on the subject vehicle speed and the approach rate or relative velocity to the target vehicle. If a collision is detected, the braking control system then may determine whether the subject vehicle speed is greater than a threshold speed and whether the subject vehicle is still closing on the target vehicle. If the subject vehicle speed is greater than a threshold speed and/or the subject vehicle is approaching or closing on the target vehicle (in other words, the relative velocity is positive and greater than a threshold level), then the braking control system maintains the braking of the subject vehicle. However, if the subject vehicle speed is not greater than the threshold speed and the subject vehicle is no longer closing on the target vehicle, then the braking control system releases the brakes of the subject vehicle.

When the AEB system has been triggered (and thus starts applying the vehicle brakes) and when the braking control system of the present invention then determines that either a collision has occurred or that the subject vehicle speed is greater than a threshold speed or that the subject vehicle is closing on the target vehicle, the braking control system may then further determine whether or not the driver's ability to drive or control the vehicle has been impaired or compromised. If the braking control system determines that the driver is impaired or compromised, then the braking control system may maintain braking of the vehicle, regardless of whether or not the driver is attempting (or appears to be attempting) to override the automatic braking system (such as when the impaired driver may unintentionally be applying the brakes or accelerator or turning the steering wheel in a manner that may otherwise be indicative of the driver attempting to control the vehicle). However, if the braking control system determines that the driver is not impaired or compromised, then any such attempts by the driver to steer or drive or control the vehicle may be allowed to override the system, whereby the vehicle brakes may be released and the driver can control or drive the vehicle.

As an example, in a situation where the SV may collide with a stationary or non-moving or moving POV, the braking control system may continue to hold or apply the vehicle brakes until the subject vehicle becomes stationary (and optionally for an additional amount of time after the vehicle stops), unless the braking control system determines that the driver is not impaired and is overriding the system. If no collision is detected and the SV speed is less than X and the POV is not closing, then the braking control system may release the vehicle brakes.

Thus, the automatic emergency braking system or braking control system of the present invention provides enhanced control of the vehicle brake system following the initial determination that the brakes should be applied (such as when an automatic emergency braking system determines that a collision with a detected target vehicle is likely or imminent). The braking control system of the present invention preferably includes a forward facing (and/or rearward facing) machine vision camera and a forward facing (and/or rearward facing) radar device or sensor (preferably such as described in U.S. Pat. No. 8,013,780, which is hereby incorporated herein by reference in its entirety). As described in U.S. Pat. No. 8,013,780, image data captured by the camera and as processed by an image processor may be fused with radar data for the overall processing and in making the determination of whether to apply the vehicle brakes and/or how much to apply the vehicle brakes.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle system may include any type of vision sensor or sensors or ranging sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, an array of a plurality of photosensor elements arranged in at least 640 columns and 480 rows (preferably a megapixel imaging array or the like), with a respective lens focusing images onto respective portions of the array. The photosensor array may comprise a plurality of photosensor elements arranged in a photosensor array having rows and columns. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/103193; WO 2012/0116043; WO 2012/0145501; WO 2012/0145343; WO 2012/154919; WO 2013/019707; WO 2013/016409; WO 2012/145822; WO 2013/067083; WO 2013/070539; WO 2013/043661; WO 2013/048994; WO 2013/063014; WO 2013/081984; WO 2013/081985; WO 2013/074604; WO 2013/086249; WO 2013/103548; WO 2013/109869; WO 2013/123161; WO 2013/126715; WO 2013/043661 and/or WO 2013/158592 and/or U.S. patent application Ser. No. 14/052,945, filed Oct. 14, 2013; Ser. No. 14/046,174, filed Oct. 4, 2013; Ser. No. 14/036,723, filed Sep. 25, 2013; Ser. No. 14/016,790, filed Sep. 3, 2013; Ser. No. 14/001,272, filed Aug. 23, 2013; Ser. No. 13/970,868, filed Aug. 20, 2013; Ser. No. 13/964,134, filed Aug. 12, 2013; Ser. No. 13/942,758, filed Jul. 16, 2013; Ser. No. 13/942,753, filed Jul. 16, 2013; Ser. No. 13/927,680, filed Jun. 26, 2013; Ser. No. 13/916,051, filed Jun. 12, 2013; Ser. No. 13/894,870, filed May 15, 2013; Ser. No. 13/887,724, filed May 6, 2013; Ser. No. 13/852,190, filed Mar. 28, 2013; Ser. No. 13/851,378, filed Mar. 27, 2013; Ser. No. 13/848,796, filed Mar. 22, 2012; Ser. No. 13/847,815, filed Mar. 20, 2013; Ser. No. 13/800,697, filed Mar. 13, 2013; Ser. No. 13/785,099, filed Mar. 5, 2013; Ser. No. 13/779,881, filed Feb. 28, 2013; Ser. No. 13/774,317, filed Feb. 22, 2013; Ser. No. 13/774,315, filed Feb. 22, 2013; Ser. No. 13/681,963, filed Nov. 20, 2012; Ser. No. 13/660,306, filed Oct. 25, 2012; Ser. No. 13/653,577, filed Oct. 17, 2012; and/or Ser. No. 13/534,657, filed Jun. 27, 2012, and/or U.S. provisional applications, Ser. No. 61/895,610, filed Oct. 25, 2013; Ser. No. 61/895,609, filed Oct. 25, 2013; Ser. No. 61/893,489, filed Oct. 21, 2013; Ser. No. 61/886,883, filed Oct. 4, 2013; Ser. No. 61/879,837, filed Sep. 19, 2013; Ser. No. 61/879,835, filed Sep. 19, 2013; Ser. No. 61/878,877, filed Sep. 17, 2013; Ser. No. 61/875,351, filed Sep. 9, 2013; Ser. No. 61/869,195, filed. Aug. 23, 2013; Ser. No. 61/864,835, filed Aug. 12, 2013; Ser. No. 61/864,836, filed Aug. 12, 2013; Ser. No. 61/864,837, filed Aug. 12, 2013; Ser. No. 61/864,838, filed Aug. 12, 2013; Ser. No. 61/856,843, filed Jul. 22, 2013; Ser. No. 61/845,061, filed Jul. 11, 2013; Ser. No. 61/844,630, filed Jul. 10, 2013; Ser. No. 61/844,173, filed Jul. 9, 2013; Ser. No. 61/844,171, filed Jul. 9, 2013; Ser. No. 61/842,644, filed Jul. 3, 2013; Ser. No. 61/840,542, filed Jun. 28, 2013; Ser. No. 61/838,619, filed Jun. 24, 2013; Ser. No. 61/838,621, filed Jun. 24, 2013; Ser. No. 61/837,955, filed Jun. 21, 2013; Ser. No. 61/836,900, filed Jun. 19, 2013; Ser. No. 61/836,380, filed Jun. 18, 2013; Ser. No. 61/834,129, filed Jun. 12, 2013; Ser. No. 61/833,080, filed Jun. 10, 2013; Ser. No. 61/830,375, filed Jun. 3, 2013; Ser. No. 61/830,377, filed Jun. 3, 2013; Ser. No. 61/825,752, filed May 21, 2013; Ser. No. 61/825,753, filed May 21, 2013; Ser. No. 61/823,648, filed May 15, 2013; Ser. No. 61/823,644, filed May 15, 2013; Ser. No. 61/821,922, filed May 10, 2013; Ser. No. 61/819,835, filed May 6, 2013; Ser. No. 61/819,033, filed May 3, 2013; Ser. No. 61/816,956, filed Apr. 29, 2013; Ser. No. 61/815,044, filed Apr. 23, 2013; Ser. No. 61/814,533, filed Apr. 22, 2013; Ser. No. 61/813,361, filed Apr. 18, 2013; Ser. No. 61/810,407, filed Apr. 10, 2013; Ser. No. 61/808,930, filed Apr. 5, 2013; Ser. No. 61/807,050, filed Apr. 1, 2013; Ser. No. 61/806,674, filed Mar. 29, 2013; Ser. No. 61/793,592, filed Mar. 15, 2013; Ser. No. 61/772,015, filed Mar. 4, 2013; Ser. No. 61/772,014, filed Mar. 4, 2013; Ser. No. 61/770,051, filed Feb. 27, 2013; Ser. No. 61/770,048, filed Feb. 27, 2013; Ser. No. 61/766,883, filed Feb. 20, 2013; Ser. No. 61/760,366, filed Feb. 4, 2013; Ser. No. 61/760,364, filed Feb. 4, 2013; Ser. No. 61/756,832, filed Jan. 25, 2013; Ser. No. 61/754,804, filed Jan. 21, 2013; Ser. No. 61/736,104, filed Dec. 12, 2012; Ser. No. 61/736,103, filed Dec. 12, 2012; Ser. No. 61/734,457, filed Dec. 7, 2012; Ser. No. 61/733,598, filed Dec. 5, 2012; Ser. No. 61/733,093, filed Dec. 4, 2012; Ser. No. 61/727,912, filed Nov. 19, 2012; and/or Ser. No. 61/727,911, filed Nov. 19, 2012, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. patent application Ser. No. 13/202,005, filed Aug. 17, 2011 and published as U.S. Publication No. US-2012-0062743, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454 and 6,824,281, and/or International Publication No. WO 2010/099416, published Sep. 2, 2010, and/or PCT Application No. PCT/US10/47256, filed Aug. 31, 2010 and published Mar. 10, 2011 as International Publication No. WO 2011/028686, and/or U.S. patent application Ser. No. 12/508,840, filed Jul. 24, 2009, and published Jan. 28, 2010 as U.S. Pat. Publication No. US 2010-0020170, and/or PCT Application No. PCT/US2012/048110, filed Jul. 25, 2012, and/or U.S. patent application Ser. No. 13/534,657, filed Jun. 27, 2012, which are all hereby incorporated herein by reference in their entireties. The camera or cameras may comprise any suitable cameras or imaging sensors or camera modules, and may utilize aspects of the cameras or sensors described in U.S. patent application Ser. No. 12/091,359, filed Apr. 24, 2008 and published Oct. 1, 2009 as U.S. Publication No. US-2009-0244361, and/or Ser. No. 13/260,400, filed Sep. 26, 2011, now U.S. Pat. No. 8,542,451, and/or U.S. Pat. No. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606 and/or 7,720,580, and/or U.S. patent application Ser. No. 10/534,632, filed May 11, 2005, now U.S. Pat. No. 7,965,336; and/or PCT Application No. PCT/US2008/076022, filed Sep. 11, 2008 and published Mar. 19, 2009 as International Publication No. WO/2009/036176, and/or PCT Application No. PCT/US2008/078700, filed Oct. 3, 2008 and published Apr. 9, 2009 as International Publication No. WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,720,580; 7,038,577; 5,929,786 and/or 5,786,772, and/or U.S. patent application Ser. No. 11/239,980, filed Sep. 30, 2005, now U.S. Pat. No. 7,881,496, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. No. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149, and/or U.S. patent application Ser. No. 11/226,628, filed Sep. 14, 2005 and published Mar. 23, 2006 as U.S. Publication No. US-2006-0061008, and/or Ser. No. 12/578,732, filed Oct. 14, 2009 and published Apr. 22, 2010 as U.S. Publication No. US-2010-0097469, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011 and published as U.S. Publication No. US-2012-0162427, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in PCT Application No. PCT/US2011/056295, filed Oct. 14, 2011 and published Apr. 19, 2012 as International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in PCT Application No. PCT/US10/25545, filed Feb. 26, 2010 and published on Sep. 2, 2010 as International Publication No. WO 2010/099416, and/or PCT Application No. PCT/US10/47256, filed Aug. 31, 2010 and published Mar. 10, 2011 as International Publication No. WO 2011/028686, and/or PCT Application No. PCT/US2011/062834, filed Dec. 1, 2011 and published Jun. 7, 2012 as International Publication No. WO2012/075250, and/or PCT Application No. PCT/US2012/048993, filed Jul. 31, 2012, and/or PCT Application No. PCT/US11/62755, filed Dec. 1, 2011 and published Jun. 7, 2012 as International Publication No. WO 2012-075250, and/or PCT Application No. PCT/CA2012/000378, filed Apr. 25, 2012, and/or U.S. patent application Ser. No. 13/333,337, filed Dec. 21, 2011 and published as U.S. Publication No. US-2012-0162427, and/or U.S. provisional applications, Ser. No. 61/615,410, filed Mar. 26, 2012; Ser. No. 61/588,833, filed Jan. 20, 2012; Ser. No. 61/570,017, filed Dec. 13, 2011; and/or Ser. No. 61/568,791, filed Dec. 9, 2011, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. patent application Ser. No. 12/091,525, filed Apr. 25, 2008, now U.S. Pat. No. 7,855,755; Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

While the above description constitutes a plurality of embodiments of the present invention, it will be appreciated that the present invention is susceptible to further modification and change without departing from the fair meaning of the accompanying claims.

The invention claimed is:

1. An automatic emergency braking system for a vehicle, said automatic emergency braking system comprising:
   a forward viewing camera that is configured to be disposed behind a windshield of a subject vehicle so as to view forwardly through the windshield;
   a control;
   said control comprising an image processor operable to process image data captured by said forward viewing camera when said forward viewing camera is disposed behind the windshield of the subject vehicle;
   wherein said control is operable to control a brake system of the subject vehicle;
   wherein, at least in part responsive to processing by said image processor of captured image data, the presence of another vehicle present in the field of view of said forward viewing camera and closing on the subject vehicle is determined;
   wherein, at least in part responsive to processing by said image processor of captured image data, a relative speed of the subject vehicle relative to the other vehicle is determined, and, responsive at least in part to a speed of the subject vehicle and the determined relative speed, said control controls the brake system of the subject vehicle;
   wherein said control applies the brakes of the brake system of the subject vehicle to slow the subject vehicle responsive at least in part to determination of the relative speed being greater than a threshold value;
   wherein, after actuation of the brake system by said control of said automatic emergency braking system of the subject vehicle, said automatic emergency braking system determines if a driver of the subject vehicle is impaired; and
   wherein, responsive to determination that the driver of the subject vehicle is impaired, said automatic emergency braking system does not allow the driver to override said control's control of the brake system of the subject vehicle, and wherein, responsive to a determination that the driver of the subject vehicle is not impaired, said automatic emergency braking system allows the driver to override said control's control of the brake system of the subject vehicle.

2. The automatic emergency braking system of claim 1, wherein said control is operable to control the brake system of the subject vehicle by applying and releasing the brakes of the subject vehicle.

3. The automatic emergency braking system of claim 2, wherein, after said automatic emergency braking system applies the brakes of the subject vehicle, said control releases the brakes of the brake system of the subject vehicle responsive to a determination that the subject vehicle is not moving.

4. The automatic emergency braking system of claim 2, wherein said control controls the brake system of the subject vehicle responsive at least in part to the speed of the subject vehicle being greater than a threshold speed.

5. The automatic emergency braking system of claim 4, wherein said automatic emergency braking system determines if the driver of the subject vehicle is impaired at least in part responsive to a cabin monitoring system of the subject vehicle.

6. The automatic emergency braking system of claim 5, wherein the cabin monitoring system comprises an interior viewing camera having a field of view that encompasses the driver of the subject vehicle, and wherein said automatic emergency braking system determines if the driver of the subject vehicle is impaired at least in part responsive to image processing of image data captured by the interior viewing camera.

7. The automatic emergency braking system of claim 1, wherein said automatic emergency braking system determines if the driver of the subject vehicle is impaired at least in part responsive to a driving characteristic of the driver of the subject vehicle.

8. The automatic emergency braking system of claim 1, wherein said automatic emergency braking system determines that the driver of the subject vehicle is impaired at least in part responsive to a determination of driver behavior.

9. The automatic emergency braking system of claim 8, wherein said automatic emergency braking system determines driver behavior responsive to braking of the subject vehicle.

10. The automatic emergency braking system of claim 8, wherein said automatic emergency braking system determines driver behavior responsive to acceleration of the subject vehicle.

11. The automatic emergency braking system of claim 8, wherein said automatic emergency braking system determines driver behavior responsive to steering of the subject vehicle.

12. The automatic emergency braking system of claim 2, wherein said automatic emergency braking system determines time-to-collision between the subject vehicle and the other vehicle.

13. The automatic emergency braking system of claim 12, wherein time-to-collision between the subject vehicle and the other vehicle is determined by a ranging sensor of the equipped vehicle.

14. The automatic emergency braking system of claim 13, wherein the ranging sensor of the equipped vehicle comprises a radar sensor.

15. The automatic emergency braking system of claim 12, wherein time-to-collision between the subject vehicle and the other vehicle is determined at least in part responsive to processing by said image processor of captured image data.

16. An automatic emergency braking system for a vehicle, said automatic emergency braking system comprising:
a forward viewing camera that is configured to be disposed behind a windshield of a subject vehicle so as to view forwardly through the windshield;
a control;
said control comprising an image processor operable to process image data captured by said forward viewing camera when said forward viewing camera is disposed behind the windshield of the subject vehicle;
wherein said control is operable to control a brake system of the subject vehicle;
wherein said control is operable to control the brake system of the subject vehicle by applying the brakes of the subject vehicle;
wherein, at least in part responsive to processing by said image processor of captured image data, the presence of another vehicle present in the field of view of said forward viewing camera and closing on the subject vehicle is determined;
wherein, at least in part responsive to processing by said image processor of captured image data, a relative speed of the subject vehicle relative to the other vehicle is determined, and, responsive at least in part to a speed of the subject vehicle and the determined relative speed, said control controls the brake system of the subject vehicle;
wherein said control applies the brakes of the brake system of the subject vehicle to slow the subject vehicle responsive at least in part to determination of the relative speed being greater than a threshold value;
wherein, after actuation of the brake system by said control of said automatic emergency braking system of the subject vehicle, said automatic emergency braking system determines if a driver of the subject vehicle is impaired;
wherein, responsive to determination that the driver of the subject vehicle is impaired, said automatic emergency braking system does not allow the driver to override said control's control of the brake system of the subject vehicle, and wherein, responsive to a determination that the driver of the subject vehicle is not impaired, said automatic emergency braking system allows the driver to override said control's control of the brake system of the subject vehicle; and
wherein said automatic emergency braking system determines time-to-collision between the subject vehicle and the other vehicle.

17. The automatic emergency braking system of claim 16, wherein time-to-collision between the subject vehicle and the other vehicle is determined by a radar sensor.

18. The automatic emergency braking system of claim 17, wherein time-to-collision between the subject vehicle and the other vehicle is determined at least in part responsive to processing by said image processor of captured image data.

19. The automatic emergency braking system of claim 16, wherein, after said automatic emergency braking system applies the brakes of the subject vehicle, said control releases the brakes of the brake system of the subject vehicle responsive to a determination that the subject vehicle is not moving.

20. An automatic emergency braking system for a vehicle, said automatic emergency braking system comprising:
a forward viewing camera that is configured to be disposed behind a windshield of a subject vehicle so as to view forwardly through the windshield;
a control;
said control comprising an image processor operable to process image data captured by said forward viewing camera when said forward viewing camera is disposed behind the windshield of the subject vehicle;
wherein said control is operable to control a brake system of the subject vehicle;
wherein, at least in part responsive to processing by said image processor of captured image data, the presence of another vehicle present in the field of view of said forward viewing camera and closing on the subject vehicle is determined;
wherein, at least in part responsive to processing by said image processor of captured image data, a relative speed of the subject vehicle relative to the other vehicle is determined, and, responsive at least in part to a speed of the subject vehicle and the determined relative speed, said control controls the brake system of the subject vehicle;
wherein said control applies the brakes of the brake system of the subject vehicle to slow the subject vehicle responsive at least in part to determination of the relative speed being greater than a threshold value;
wherein, after actuation of the brake system by said control of said automatic emergency braking system of the subject vehicle, said automatic emergency braking system determines if a driver of the subject vehicle is impaired;
wherein, responsive to determination that the driver of the subject vehicle is impaired, said automatic emergency braking system does not allow the driver to override said control's control of the brake system of the subject vehicle, and wherein, responsive to a determination that the driver of the subject vehicle is not impaired, said automatic emergency braking system allows the driver to override said control's control of the brake system of the subject vehicle; and wherein said automatic emergency braking system determines if the driver of the subject vehicle is impaired at least in part responsive to at least one of (i) a cabin monitoring system of the subject vehicle and (ii) a determination of driver behavior.

21. The automatic emergency braking system of claim 20, wherein said automatic emergency braking system determines time-to-collision between the subject vehicle and the other vehicle.

\* \* \* \* \*